(12) United States Patent
Takarada

(10) Patent No.: US 7,333,656 B2
(45) Date of Patent: Feb. 19, 2008

(54) IMAGE PROCESSING METHOD AND IMAGE PROCESSING APPARATUS

(75) Inventor: Shinichi Takarada, Niihama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 613 days.

(21) Appl. No.: 10/992,773

(22) Filed: Nov. 22, 2004

(65) Prior Publication Data

US 2005/0123195 A1    Jun. 9, 2005

(30) Foreign Application Priority Data

Nov. 26, 2003    (JP)    ............... 2003-396042

(51) Int. Cl.
*G06K 9/00* (2006.01)
(52) U.S. Cl. ............... 382/169; 382/167; 382/173; 382/237; 382/274; 382/321; 345/596; 358/1.9
(58) Field of Classification Search ............... 382/133, 382/164, 167, 168, 169, 170, 172, 173, 237, 382/270, 274, 317, 321; 358/1.9, 3.01–3.23; 345/596, 690–697
See application file for complete search history.

(56) References Cited

U.S. PATENT DOCUMENTS

2001/0002936 A1*  6/2001  Tsuji et al. ............... 382/170
2003/0118233 A1*  6/2003  Olsson .................... 382/173
2003/0137593 A1*  7/2003  Watanabe et al. ........ 348/274
2006/0098858 A1*  5/2006  Guittet ..................... 382/133
2006/0133478 A1*  6/2006  Wen ..................... 375/240.03

FOREIGN PATENT DOCUMENTS

| JP | 2000-333022 | 11/2000 |
|---|---|---|
| JP | 3240389 | 10/2001 |

* cited by examiner

*Primary Examiner*—Matthew C. Bella
*Assistant Examiner*—Ali Bayat
(74) *Attorney, Agent, or Firm*—Wenderoth, Lind & Ponack, L.L.P.

(57) ABSTRACT

An image processing method comprises forming a histogram of an entire image, determining a ratio between a reference luminance value and a reference threshold value at a maximum frequency, dividing the image into local areas, forming a histogram of each local area, determining a luminance value at a maximum frequency, multiplying this luminance value by the ratio between the reference luminance value and the reference threshold value to obtain a threshold value of the local area, and performing binarization for the local area using the threshold value. Therefore, it is possible to determine an appropriate threshold value in each local area of a multiple gray-level image, and obtain, using this threshold value, a binarized image which enables accurate separation of an object from a background.

23 Claims, 6 Drawing Sheets original image target binarized image result by fixed threshold value

IMAGE PROCESSING METHOD AND IMAGE PROCESSING APPARATUS

FIELD OF THE INVENTION

The present invention relates to an image processing method and an image processing apparatus for performing binarization to convert image data of multiple gray levels, which is obtained by shooting an object with a common digital camera, into binarized image data.

BACKGROUND OF THE INVENTION

For example, as a pretreatment of an OCR (Optical Character Reader), binarization must be carried out, that is, characters written on a paper are read by a camera or a scanner as image data having multiple gray levels not less than three, i.e., as a gray-scale image, and thereafter, the image is separated into a character area and a background area. In this case, using a predetermined threshold value as a reference, a portion having a gray level larger than the threshold value, i.e., a light portion, is converted into "1" as a paper area to be a background, and a portion having a gray level equal to or smaller than the threshold value, i.e., a dark portion, is converted into "0" as a paper area. In this method, however, uneven lighting or the like may cause a portion of the background area to be "0" and undesirably recognized as a character area, resulting in inaccurate reading of the characters.

Further, the method of separating an object image from a background image by binarizing a multiple gray-level image as described above is used for separating shot objects such as bacteria from a microscope image to determine the positions or number of bacteria. FIG. 2 shows an original image 201 having multiple gray-levels, which is obtained by shooting a microscope image with a digital camera, a target binarized image 205 to be obtained by binarizing the original image 201, and a binarized image 206 obtained by binarizing the original image 201 by a conventional method using a fixed threshold value.

The original image 201 is an image having 256 levels of gray per pixel. The left portion of the image 201 is dark due to uneven lighting. There are bacteria 202 to 204 on the original image 201, and it is an object to obtain an image in which the positions or number of the bacteria can be determined, i.e., a binarized image 205 in which the bacteria are separated from the background. However, when the original image 201 is binarized using a fixed threshold value, for example, when, using "128" as a threshold value, pixels of the original image 201 larger than "128" are replaced with white while pixels equal to or smaller than "128" are replaced with black, the binarized image 206 shown in FIG. 2 is obtained.

In the binarized image 206, since the bacterium 203 is equal to or smaller than the threshold value "128" and the neighboring pixels are larger than the threshold value "128", the bacterium 203 is normally detected. However, since the right portion of the image is dark, the background becomes to have a value smaller than the threshold value on the right side of the image, and both of the bacterium and the background are black, and the bacterium 204 is buried in the background. Conversely, since the bacterium 202 is irradiated with a strong light, it becomes to have a value larger than the threshold value and turns to white. As a result, it becomes difficult to separate the shot objects such as bacteria from the background to obtain accurate positions or number of the bacteria.

As a countermeasure against this problem, there is proposed a method of dividing an image into local areas, and determining a specific threshold value for each local area on the basis of the average of the local areas (for example, refer to Japanese Patent No. 3240389).

In the conventional image processing method constructed as described above, a threshold value is independently determined for each local area to solve the problem that is caused by using a single threshold value for binarization. However, since the threshold value is determined on the basis of the average of the luminance values of the local areas, the average luminance value becomes small in an area where the density of objects to be separated from the background is high, and a lower threshold value is set, that is, an appropriate threshold value cannot be obtained, resulting in a possibility that a desired binarized image cannot be obtained.

SUMMARY OF THE INVENTION

The present invention is made to solve the above-described problems and has for its object to provide an image processing method and an image processing apparatus for determining an appropriate threshold value for each local area of a multiple gray-level image, and obtaining, using this threshold value, a binarized image in which an object can be accurately separated from a background.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided an image processing method for generating a binarized image from a gray-scale image as an original image, and the method comprises the steps of generating a histogram of the gray scale in the whole or a part of the original image; determining a first reference luminance value and a reference threshold value as a threshold value for binarization, on the basis of the histogram; storing a ratio between the first reference luminance value and the reference threshold value as a luminance ratio; generating a local histogram for a local area of the original image; determining a second reference luminance value on the basis of the local histogram, and determining a threshold value for binarization by performing an arithmetic operation on the second reference luminance value and the luminance ratio; and binarizing an image of an area in the vicinity of the local area of the original image by using the threshold value. In this method, a histogram corresponding to the whole image is formed, and a ratio between a reference luminance value and a reference threshold value at the maximum frequency is obtained. Thereafter, the image is divided into local areas, a histogram corresponding to each local area is formed, and a luminance value at the maximum frequency is obtained. Then, this luminance value is multiplied by the ratio between the reference luminance value and the reference threshold value to obtain a threshold value in the local area, and the local area is binarized using the threshold value. Therefore, it is possible to obtain an appropriate threshold value in each local area of a multiple gray-level image, and obtain, using the threshold value, a binarized image which enables accurate separation of an object from a background.

According to a second aspect of the present invention, in the image processing method according to the first aspect, the second reference luminance value determined based on the local histogram is obtained by performing the same processing as that for the first reference luminance value. Therefore, it is possible to obtain an appropriate threshold value in each local area of a multiple gray-level image, for obtaining a binarized image which enables accurate separation of an object from a background.

According to a third aspect of the present invention, in the image processing method according to the second aspect, the first reference luminance value and the second reference luminance value are luminance values at points in the histograms indicating the maximum values of the respective histograms. Therefore, it is possible to obtain an appropriate threshold value in each local area of a multiple gray-level image, for obtaining a binarized image which enables accurate separation of an object from a background.

According to a fourth aspect of the present invention, in the image processing method according to the second aspect, the first reference luminance value and the second reference luminance value are luminance values at points in the histograms indicating the maximum values, which luminance values are determined after subjecting the respective histograms to low-pass filtering. Therefore, it is possible to obtain an appropriate threshold value in each local area of a multiple gray-level image, for obtaining a binarized image which enables accurate separation of an object from a background.

According to a fifth aspect of the present invention, in the image processing method according to the first aspect, the reference threshold value is a luminance value in a concave portion adjacent to the maximum value of the histogram in the whole or a part of the original image. Therefore, it is possible to obtain an appropriate threshold value in each local area of a multiple gray-level image, for obtaining a binarized image which enables accurate separation of an object from a background.

According to a sixth aspect of the present invention, in the image processing method according to the fifth aspect, when there is no concave portion adjacent to the maximum value of the histogram, a luminance value at an inflection point of the histogram is used as the reference threshold value. Therefore, it is possible to obtain an appropriate threshold value in each local area of a multiple gray-level image, for obtaining a binarized image which enables accurate separation of an object from a background.

According to a seventh aspect of the present invention, in the image processing method according to the first aspect, a luminance value in a local convex portion adjacent to the maximum value of the histogram in the whole or a part of the original image and a luminance value at a point indicating the maximum value in the histogram are determined, to provide a value included between the both luminance values as the reference threshold value. Therefore, it is possible to obtain an appropriate threshold value in each local area of a multiple gray-level image, for obtaining a binarized image which enables accurate separation of an object from a background.

According to an eighth aspect of the present invention, in the image processing method according to the first aspect, the reference threshold value is a luminance value in a position in the vicinity of the maximum value of the histogram in the whole or a part of the original image, wherein the ratio of the reference threshold value to the maximum value becomes a predetermined value. Therefore, it is possible to obtain an appropriate threshold value in each local area of a multiple gray-level image, for obtaining a binarized image which enables accurate separation of an object from a background.

According to a ninth aspect of the present invention, in the image processing method according to the first aspect, a reference luminance value is determined as a luminance value in a position in the vicinity of the maximum value of the histogram in the whole or a part of the original image, wherein the ratio of the luminance value to the maximum value becomes a predetermined value, and the reference threshold value is determined as a luminance value in a position symmetrically opposed to the obtained reference luminance value with the luminance value at the maximum value in the center. Therefore, it is possible to obtain an appropriate threshold value in each local area of a multiple gray-level image, for obtaining a binarized image which enables accurate separation of an object from a background.

According to a tenth aspect of the present invention, in the image processing method according to the first aspect, the whole original image is divided into plural local areas, and each local area is individually provided with a threshold value, and binarized using the threshold value. Therefore, it is possible to obtain an appropriate threshold value in each local area of a multiple gray-level image, for obtaining a binarized image which enables accurate separation of an object from a background.

According to an eleventh aspect of the present invention, in the image processing method according to the tenth aspect, the whole original image is divided into plural local areas, and each local area is individually provided with a threshold value, and when there is a local area having a threshold value significantly different from a predetermined value that is determined in comparison with a threshold value of an adjacent local area, the threshold value of this local area is reset by an arithmetic operation using the threshold value of the adjacent local area. Therefore, it is possible to obtain an appropriate threshold value in each local area of a multiple gray-level image, for obtaining a binarized image which enables accurate separation of an object from a background.

According to a twelfth aspect of the present invention, in the image processing method according to the first aspect, when determining the luminance ratio, unnecessary values based on back ground characteristics are removed from the first reference luminance value and the reference voltage, respectively. Therefore, it is possible to obtain an appropriate threshold value in each local area of a multiple gray-level image, for obtaining a binarized image which enables accurate separation of an object from a background.

According to a thirteenth aspect of the present invention, there is provided an image processing apparatus for generating a binarized image from a gray-scale image as an original image, and the apparatus comprises: a storage unit for storing multiple gray-level image data of the gray-scale image, and outputting, as a target image data, the whole or a specific area of the stored image data; a histogram generation unit for generating a histogram of the gray scale in the target image data; a reference luminance ratio generation unit for determining a first reference luminance value and a reference threshold value as a threshold value for binarization, on the basis of the histogram, and outputting a ratio between the first reference luminance value and the reference threshold value as a reference luminance ratio; an image division unit for dividing the target image data into plural local areas and outputting the data, and outputting division information of the target image data; a local histogram generation unit for generating a local histogram for each local area; a local area reference luminous value generation unit for determining a second reference luminance value on the basis of the local histogram; a threshold value generation unit for determining a threshold value for binarization by performing an arithmetic operation on the second reference luminance value and the reference luminance value; and a binarization unit for binarizing the target image data for every local area on the basis of the division information, thereby generating a binarized image of the target image data. Therefore, it is possible to obtain an appropriate threshold value in each local area of a multiple gray-level image, and obtain, using the threshold value, a binarized image which enables accurate separation of an object from a background.

According to a fourteenth aspect of the present invention, in the image processing apparatus according to the thirteenth aspect, the histogram generation unit and the local histogram generation unit determine the first reference luminance value and the second reference luminance value by the same processing, respectively. Therefore, it is possible to obtain an appropriate threshold value in each local area of a multiple gray-level image, for obtaining a binarized image which enables accurate separation of an object from a background.

According to a fifteenth aspect of the present invention, in the image processing apparatus according to the fourteenth aspect, the first reference luminance value and the second reference luminance value are luminance values at points in the histograms indicating the maximum values of the respective histograms. Therefore, it is possible to obtain an appropriate threshold value in each local area of a multiple gray-level image, for obtaining a binarized image which enables accurate separation of an object from a background.

According to a sixteenth aspect of the present invention, in the image processing apparatus according to the fourteenth aspect, the first reference luminance value and the second reference luminance value are luminance values at points in the histograms indicating the maximum values, which luminance values are obtained after subjecting the respective histograms to low-pass filtering. Therefore, it is possible to obtain an appropriate threshold value in each local area of a multiple gray-level image, for obtaining a binarized image which enables accurate separation of an object from a background.

According to a seventeenth aspect of the present invention, in the image processing apparatus according to the thirteenth aspect, the reference luminance ratio generation means employs, as the reference threshold value, a luminance value in a concave portion adjacent to the maximum value of the histogram in the target image data. Therefore, it is possible to obtain an appropriate threshold value in each local area of a multiple gray-level image, for obtaining a binarized image which enables accurate separation of an object from a background.

According to an eighteenth aspect of the present invention, in the image processing apparatus according to the seventeenth aspect, when there is no concave portion adjacent to the maximum value of the histogram, a luminance value at an inflection point of the histogram is used as the reference threshold value. Therefore, it is possible to obtain an appropriate threshold value in each local area of a multiple gray-level image, for obtaining a binarized image which enables accurate separation of an object from a background.

According to a nineteenth aspect of the present invention, in the image processing apparatus according to the thirteenth aspect, the reference luminance ratio generation unit obtains a luminance value in a local convex portion adjacent to the maximum value of the histogram in the target image data, and a luminance value at a point indicating the maximum value of the histogram, and employs a value included between the both luminance values as the reference threshold value. Therefore, it is possible to obtain an appropriate threshold value in each local area of a multiple gray-level image, for obtaining a binarized image which enables accurate separation of an object from a background.

According to a twentieth aspect of the present invention, in the image processing apparatus according to the thirteenth aspect, the reference luminance ratio generation unit determines, as the reference threshold value, a luminance value in a position in the vicinity of the maximum value of the histogram of the target image data, wherein the ratio of the luminance value to the maximum value becomes a predetermined value. Therefore, it is possible to obtain an appropriate threshold value in each local area of a multiple gray-level image, for obtaining a binarized image which enables accurate separation of an object from a background.

According to a twenty-first aspect of the present invention, in the image processing apparatus according to the thirteenth aspect, the reference luminance ratio generation unit determines, as a reference luminance value, a luminance value in a position in the vicinity of the maximum value of the histogram in the whole or a part of the original image, wherein the ratio of the luminance value to the maximum value becomes a predetermined value, and the reference threshold value is determined as a luminance value in a position symmetrically opposed to the obtained reference luminance value with the luminance value at the maximum value in the center. Therefore, it is possible to obtain an appropriate threshold value in each local area of a multiple gray-level image, for obtaining a binarized image which enables accurate separation of an object from a background.

According to a twenty-second aspect of the present invention, in the image processing apparatus according to the thirteenth aspect, the threshold value generation unit comprises: a threshold value memory for holding the threshold values of the respective local areas; a threshold value comparison unit for comparing the threshold value of a specific local area, which is stored in the threshold value memory, with the threshold values of neighboring local areas; and a threshold value determination change unit for replacing the threshold value of the specific local area with an average of the threshold values of the neighboring local areas when the threshold value of the specific local area has a difference equal to or larger than a predetermined value as compared with the threshold values of the neighboring local areas. Therefore, it is possible to obtain an appropriate threshold value in each local area of a multiple gray-level image, for obtaining a binarized image which enables accurate separation of an object from a background.

According to a twenty-third aspect of the present invention, the image processing apparatus of claim 13 being used as a card reading unit in a cellular phone having a built-in camera. Therefore, it is possible to realize functions of shooting a card with the built-in camera, reading characters on the card, and storing the characters in database.

DETAILED DESCRIPTION OF THE PREFERRED EMBODIMENTS

Embodiment 1

Figure 3:
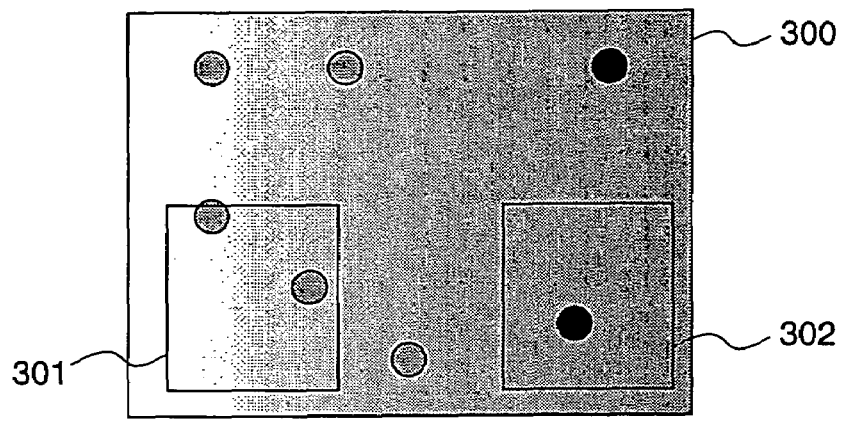
FIG. 3 is a diagram illustrating histograms corresponding to an original image and parts of the image, for explaining an image processing method according to the first embodiment of the present invention.
Figure 3:
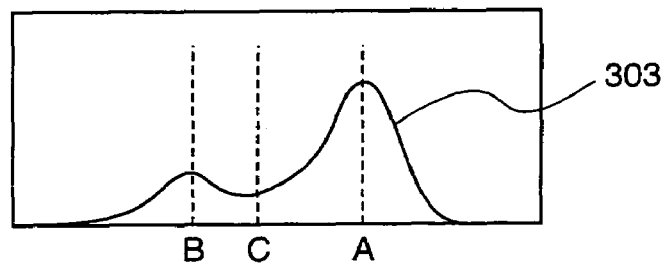
Figure 3:
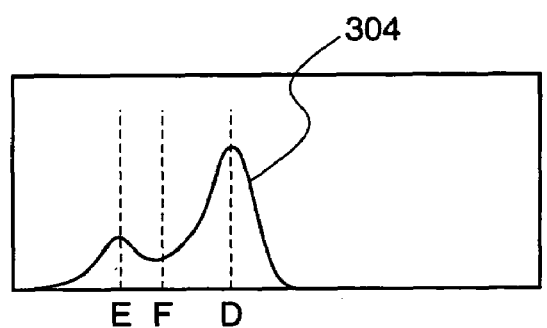
Figure 3:
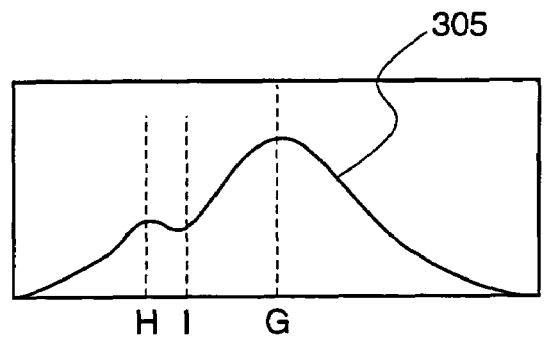

FIG. 3 is a diagram for explaining the principle of an image processing method according to a first embodiment of the present invention, illustrating an original image 300 having three or more levels of gray, that is, a gray-scale original image, and histograms corresponding to local areas of the original image 300. An image obtained by shooting bacteria is used as the original image 300. A histogram 303 is a histogram of luminance values in a local area 301 of the original image 300.

The histogram 303 shows the luminance values of all pixels included in the local area 301 by their frequencies, and dark pixels, i.e., pixels whose luminance values are "0" are located at the left side of the image while bright pixels, i.e., pixels whose luminance values are "255", are located at the right side of the image. The number of pixels indicating each luminance value is taken in the vertical axis. Since, in the local area 301, the background has the largest area, the number of pixels in the vicinity of a luminance A of the background is largest in the histogram 303. A bacterium portion having a brightness level of a luminance B appears as a small peak. In the local area 301, it is possible to separate the bacteria from the background by using a luminance C as a threshold value.

Likewise, the histogram 304 is a histogram of the luminance values in a local area 302 of the original image 300. Since the local area 302 is darker than the local area 301 as a whole, the histogram 304 is shifted toward the left as compared with the histogram 303. Also in the local area 302, since the background has the largest area, the number of pixels in the vicinity of a luminance D of the background is largest. Further, a bacterium portion having a brightness level of a luminance E appears as a small peak. In the local area 302, the bacterium portion can be separated from the background using a luminance F as a threshold value.

The histogram 305 is a histogram of the luminance values in the whole original image 300. Since the histogram 305 is obtained by totalizing the histograms of all local areas including the local areas 301 and 302, peaks of the histogram 305 are relatively gentle. The histogram 305 has a peak that appears at a luminance G where the pixels of the background are largest in number, and a peak that appears at a luminance H where the pixels of the bacteria are largest in number. The bacteria are separated from the background by a luminance I. When binarization is carried out using this value I as a threshold value for the whole image, since the value I is lower than the luminance B shown in the histogram 303, the bacterium portion is undesirably judged as the background in the local area 301, and therefore, normal processing cannot be carried out.

Therefore, binarization is carried out using a threshold value suited to each local area to obtain a binarized image which enables accurate separation of the object, i.e., the image of bacterium, from the background image. On determination of the threshold value, the physical property of each local area is analyzed. For example, it is premised that the background has reflectivity of 50% and the bacterium portion has reflectivity of 10% with respect to applied light. Assuming that the intensity of the light applied to the local area 301 is X, the luminance A is equal to 0.5X and the luminance B is equal to 0.1X. Assuming that the threshold value is a median value C between the luminance A and the luminance B, the luminance C has a value of 0.3X(=(0.5X+0.1X)/2). When X is deleted from the relationship between A and C, C=0.6A holds. Likewise, as for the relationship between the luminance D and the threshold value F in the local area 302, F=0.6D holds. Thus, the threshold value in every local area is obtained by multiplying the luminance of the bacterium portion by the same factor. In similar manner, the threshold value in each local area can be obtained by multiplying the luminance of the bacterium portion by the same factor. However, when the area of the background is large as in the image 300, since the luminance of the background can be obtained with the highest reliability, the threshold value is obtained by multiplying the luminance of the background by the factor.

The factor to be used in the multiplication can be reliably obtained by taking the ratio between the peak G of the background and the threshold value I in the histogram 305 of the whole original image 300 or a histogram of a large area that follows the histogram 305.

Figure 1:
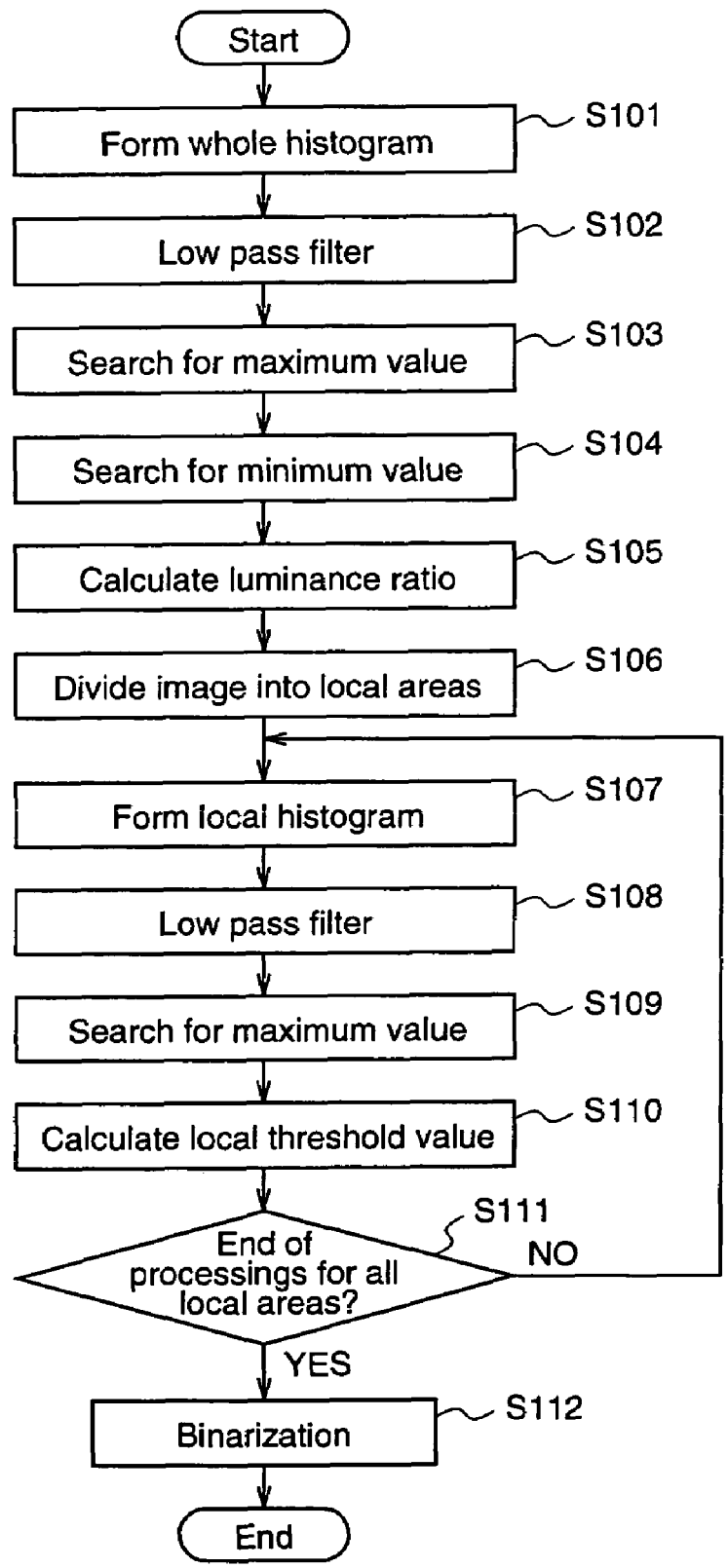
FIG. 1 is a flowchart for explaining an image processing method according to a first embodiment of the present invention.
Figure 2:
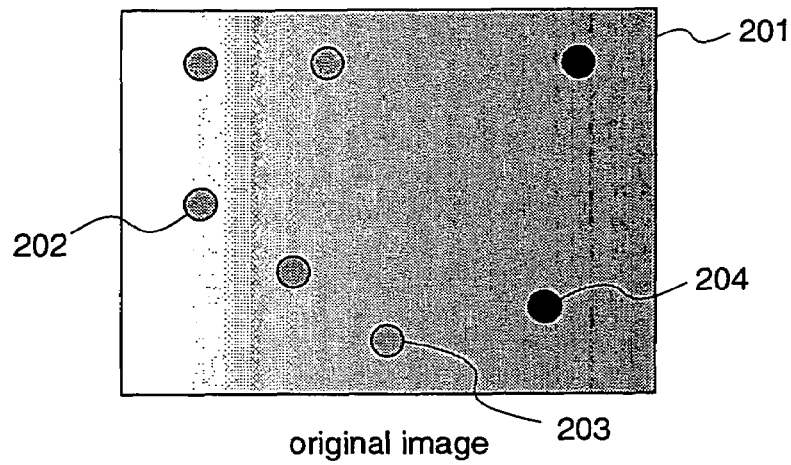
FIG. 2 is a diagram for explaining the conventional image processing method.
Figure 2:
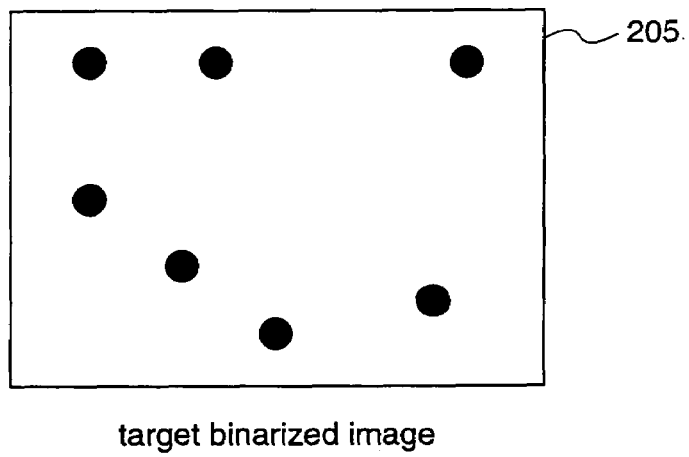
Figure 2:
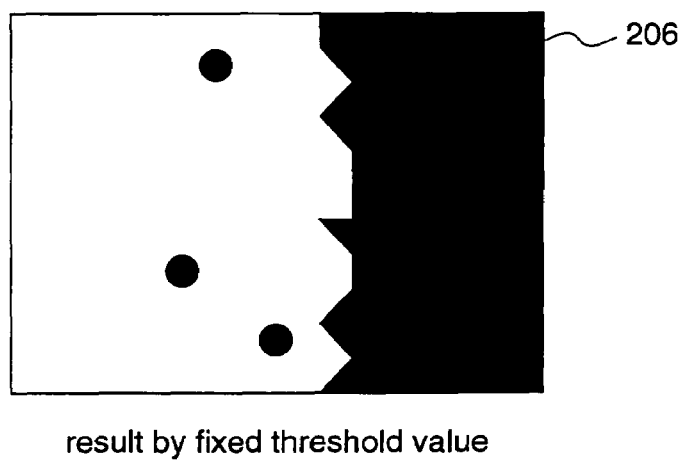

Based on the above description, the procedure for binarizing the original image using the image processing method according to the first embodiment will be described with reference to FIG. 1. FIG. 1 is a flow chart for explaining the image processing method according to the first embodiment. Hereinafter, a description will be given of the steps of binarizing a microscope image (original image) 201 of bacteria (refer to FIG. 2) having a size of 1000×1000 pixels, each pixel having 256 levels of gray, thereby to obtain a binarized image 205.

Initially, in step S101, a luminance histogram corresponding to the whole image is formed. Although a histogram of the whole image is formed in this first embodiment, if the periphery of the image is dark, a luminance histogram of a center portion of the image may be formed. Since the histogram thus formed has variations in distribution due to noise or the like, it is subjected to a low-pass filter in step S102. In the actual processing, the average of frequencies corresponding to five luminance levels is obtained.

In step S103, a luminance value of the highest frequency is obtained in the low-pass filtered histogram. Hereinafter, this luminance value is referred to as a reference luminance value. This value corresponds to the above-mentioned luminance value G of the background shown in FIG. 3. In step S104, a search is made for a luminance value indicating a minimum value in the direction from the reference luminance value obtained in step S103 toward the lower luminance side. This portion corresponds to the luminance I shown in FIG. 3, and means a threshold value for binarization (hereinafter referred to as a reference threshold value).

In step S105, the ratio I/G between the reference threshold value and the reference luminance value is obtained and stored as J. In step S106, the original image 201 is divided into local areas each having 100×100 pixels. There are vertical 10×horizontal 10 local areas. In step S107, a luminance histogram is formed for one local area. Assuming that a local area 301 shown in FIG. 3 is a target local area, a histogram 303 is formed. When the original image is divided into very small local areas, a histogram may be formed for a wider area having the local area in the center, in order to increase the accuracy against noise.

In step S108, the histogram of each local area is low-pass filtered. In step S109, a luminance value indicating the highest frequency is obtained in the low-pass filtered histogram. This value corresponds to the luminance value A in the background area. In step S110, the luminance value indicating the maximum frequency of the local area is multiplied by the above-mentioned J to obtain a threshold value in the local area. For example, as for the local area 301, a threshold value in the local area 301 can be obtained by multiplying the luminance value A by the J. In step S111, the processes from step S107 to step S110 are repeated for all local areas. In step S112, all of the pixels in the original image 300 are subjected to binarization for each local area using the threshold value obtained for each local area, thereby obtaining a binarized image 205.

In step S104, a search is made for a minimum luminance value in the direction from the reference luminance value obtained in step S103 toward the lower luminance value, and a reference threshold value is determined according to the minimum value. However, when a search is made for a maximum value from the lower luminance side of the histogram, the obtained maximum value indicates the luminance value of the bacteria. Therefore, a median value between this luminance value and the luminance value of the background may be used as a reference threshold value.

In the above-mentioned method, the reference threshold value is obtained using the minimum value or the maximum value in step S104. However, there may be cases where such maximum or minimum value does not exist, depending on images. Further, in the threshold calculation method in step S110, there may be cases where an accurate threshold value cannot be calculated due to unevenly distributed bacteria. Hereinafter a description will be given of a method for calculating a reference threshold value and a threshold value of each local area in the case where no maximum or minimum value exists.

Initially, the process of calculating a reference threshold value will be described.

Figure 4:
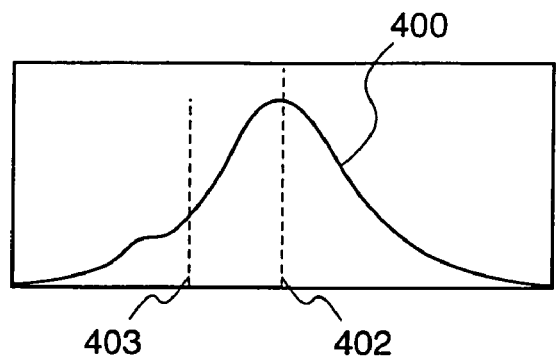
FIG. 4 is a diagram for explaining a modification of the image processing method according to the first embodiment of the present invention.

FIG. 4 is a diagram for explaining a modification of the process of determining a reference threshold value in the image processing method according to the first embodiment, and it illustrates a histogram 400 of an image. In this modification, since the illumination intensity significantly varies in the original image, the luminance distribution of the background overlaps the luminance distribution of the bacteria, and therefore, no maximum or minimum value exists between them. Accordingly, after searching for a minimum value in the direction from the reference luminance value 402 that shows the maximum frequency toward the lower luminance, if there is no minimum value in the searched area, a luminance value 403 at an inflection point is used as a reference threshold value.

Figure 5:
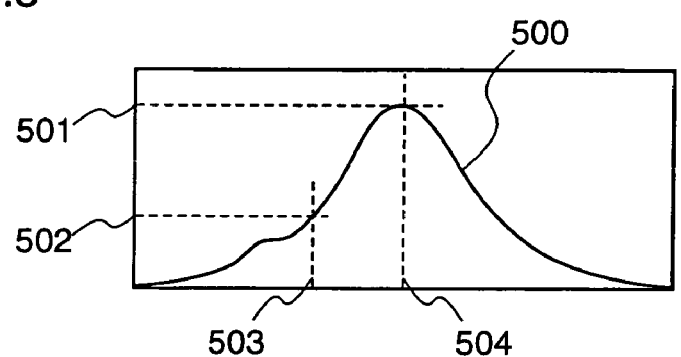
FIG. 5 is a diagram for explaining another modification of the image processing method according to the first embodiment of the present invention.

Since there are cases where the inflection point cannot be obtained with stability, another method for obtaining a reference threshold value in such cases will be described with reference to FIG. 5. In FIG. 5, it is assumed that a luminance value indicating a maximum frequency 501 of the histogram 500 (a peak value in the histogram) is a reference luminance value 504. A ratio, for example, 40%, is previously given to the frequency 501 at this time, and a luminance value having a frequency 502 that is equal to or lower than this ratio is detected in the direction toward the lower luminance. Thus obtained luminance value is used as a reference threshold value 503. In this method, if the shape of the histogram is previously known to some extent, the reference threshold value can be reliably obtained without affected by noise.

Figure 6:
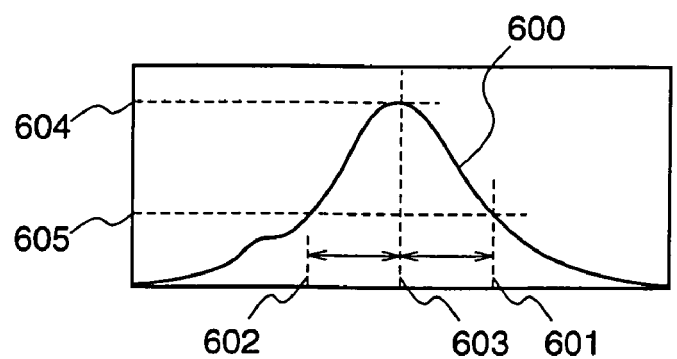
FIG. 6 is a diagram for explaining still another modification of the image processing method according to the first embodiment of the present invention.

Although, in the above-mentioned method, the luminance value of the frequency 502 that is equal to or lower than 40% of the maximum frequency 504 is determined on the lower luminance side, this determination is likely to be influenced by the number of bacteria. Therefore, a reference threshold value may be obtained utilizing the higher luminance side to eliminate such influence. For example, in FIG. 6, a luminance value indicating a maximum frequency 604 of a histogram 600 (peak value in the histogram) is a reference luminance value 603. A ratio, for example 40%, is previously given to the frequency 604 at this time, and a luminance value of a frequency 605 that is equal to or lower than 40% is detected in the direction toward the higher luminance. As a result, a luminance value 601 is obtained, and a luminance value 602 that is symmetrically opposed to the obtained luminance value 601 with respect to the luminance 603 is used as a reference value. For example, when the luminance 603 has a value of 150 while the luminance 601 has a value of 180, the reference threshold value 602 becomes 120.

Next, a description will be given of a modification of a method for calculating a threshold value in each local area. Since, in step S110, a threshold value of each local area is obtained utilizing only the maximum value of the histogram, even when the local area includes no bacteria, the threshold value can be accurately obtained. However, when the bacteria concentrate in a specific local area and thereby the maximum value of the histogram indicates an area of bacteria, an accurate threshold value cannot be obtained. In order to avoid this problem, after performing the process in step S111 shown in FIG. 1, the threshold value of each local area is compared with the threshold values of the neighboring local areas. As for a local area having a difference equal to or larger than a predetermined value, the current threshold value thereof is discarded, and a new threshold value is obtained by interpolating the neighboring threshold values, thereby obtaining an appropriate threshold value.

Further, in step S110, the luminance value A of the background is multiplied by the J which is the ratio I/G between the reference threshold value calculated in step S105 shown in FIG. 5 and the reference luminance value to obtain the threshold value in the local area. However, when the original image is obtained by shooting the object with a device such as a CCD, since a dark current value based on the CCD characteristics is superposed on the luminance value, the influence of the dark current must be eliminated to obtain an accurate threshold value. In this case, assuming that the luminance component superposed by the dark current is Z, the ratio between the reference threshold value and the reference luminance value can be obtained by $J=(I-Z)/(G-Z)$, and the threshold value in the local area can be obtained by $J\times(A-Z)+Z$, whereby an accurate threshold value can be obtained.

As described above, the image processing method according to the first embodiment comprises forming a histogram of gray levels in the whole original image or a part of the original image; obtaining a reference threshold value corresponding to a threshold value for binarization and a first reference luminance value, on the basis of the histogram; storing the ratio between them as a luminance ratio; generating a local histogram in a local area in the original image; obtaining a second reference luminance value on the basis of the local histogram; obtaining a threshold value for binarization by performing an arithmetic operation between the second reference luminance value and the luminance ratio; and binarizing an image in an area in the vicinity of the local area of the original image using the threshold value. In other words, a histogram is formed for the whole image, and the ratio between the reference luminance value of the maximum frequency and the reference threshold value is obtained. Thereafter, the image is divided into local areas, a histogram is formed for each local area, and a luminance value of the maximum frequency is obtained. Then, this value is multiplied by the ratio between the reference luminance value and the reference threshold value to obtain a threshold value in the local area, and binarization for the local area is carried out using the threshold value. Therefore, an appropriate threshold value in each local area of an image having multiple levels of gray can be obtained, and a binarized image which enables accurate separation of the object from the background can be obtained using the threshold value.

Embodiment 2

Figure 7:
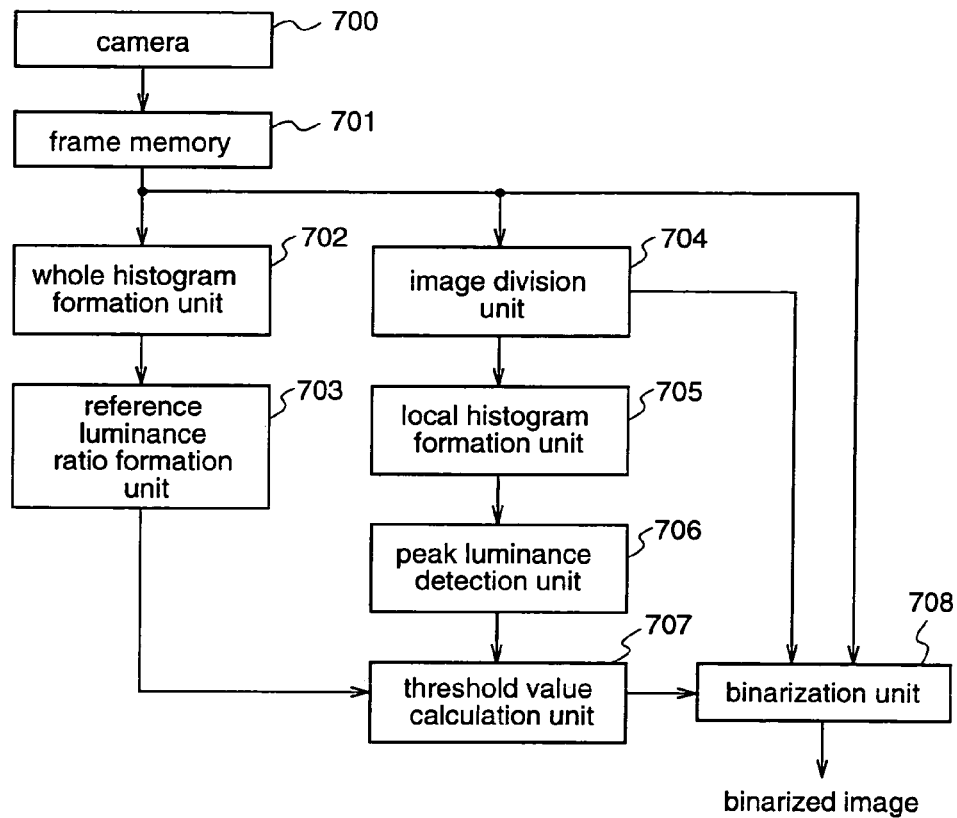
FIG. 7 is a block diagram illustrating an image processing apparatus according to a second embodiment of the present invention.

FIG. 7 is a block diagram illustrating an image processing apparatus according to a second embodiment of the present invention, for implementing the image processing method according to the first embodiment.

With reference to FIG. 7, an image taken by a camera 700 is stored in a frame memory 701. The taken image is a gray image comprising 1000×1000 pixels, each pixel having 256 levels of gray. The frame memory 701 outputs, as image data, the whole area of the stored image or a part of the image. In this second embodiment, the frame memory 701 outputs the whole area of the image.

A whole histogram formation unit 702 forms a luminance histogram of the whole image data outputted from the frame memory 701, as shown in steps S101 and S102 of the first embodiment.

A reference luminance ratio formation unit 703 obtains, as a reference luminance value G, a luminance value indicating a maximum frequency of the luminance histogram that is formed by the whole histogram formation unit 702, and simultaneously, searches for a luminance indicating a minimum value in the direction from the reference luminance value G toward the lower luminance, thereby to obtain a reference threshold value I, and divides the reference threshold value I by the reference luminance value G to obtain a value J as a reference luminance ratio, as shown in steps S103 to S105 of the first embodiment.

On the other hand, an image division unit 704 divides the image data outputted from the frame memory 701 into vertical 10×horizontal 10 local areas, as shown in step S106 of the first embodiment. At this time, each local area has a size of 100×100 pixels. Then, division information indicating the size of the local areas into which the image data outputted from the frame memory 701 is divided is output to a binarization unit 708.

A local histogram formation unit 705 forms a local histogram for each of the local areas into which the image data is divided by the image division unit 704, as shown in steps S107 and S108 of the first embodiment.

A peak luminance detection unit 706 obtains a luminance value indicating the maximum frequency of the local histogram that is formed by the local histogram formation unit 705, and outputs the luminance value as a background luminance value A of the local area, as shown in step S109 of the first embodiment.

A threshold value calculation unit 707 multiplies the reference luminance ratio J outputted from the reference luminance ratio generation unit 703 by the background luminous value A outputted from the peak luminous detection unit 706 to obtain a threshold value for binarization in the local area, as shown in step S110 of the first embodiment.

A binarization unit 708 repeatedly performs binarization for the image data outputted from the frame memory 701, using the threshold value obtained for each local area by the threshold value calculation unit 707, on the basis of the division information from the image division unit 704, thereby eventually performing binarization for the whole image data outputted from the frame memory 701 to output a binarized image of the image data.

The threshold calculation unit 707 may be provided with a threshold value memory for holding the threshold values of the respective local areas; a threshold value comparator for comparing a threshold value of a certain local area which is stored in the threshold value memory with threshold values of neighboring local areas; and a threshold value judgement change unit for, when the threshold value compared by the threshold value comparison unit has a difference equal to or larger than a predetermined value, replacing the threshold value of the local area with the average of the threshold values of the neighboring local areas.

Figure 9:
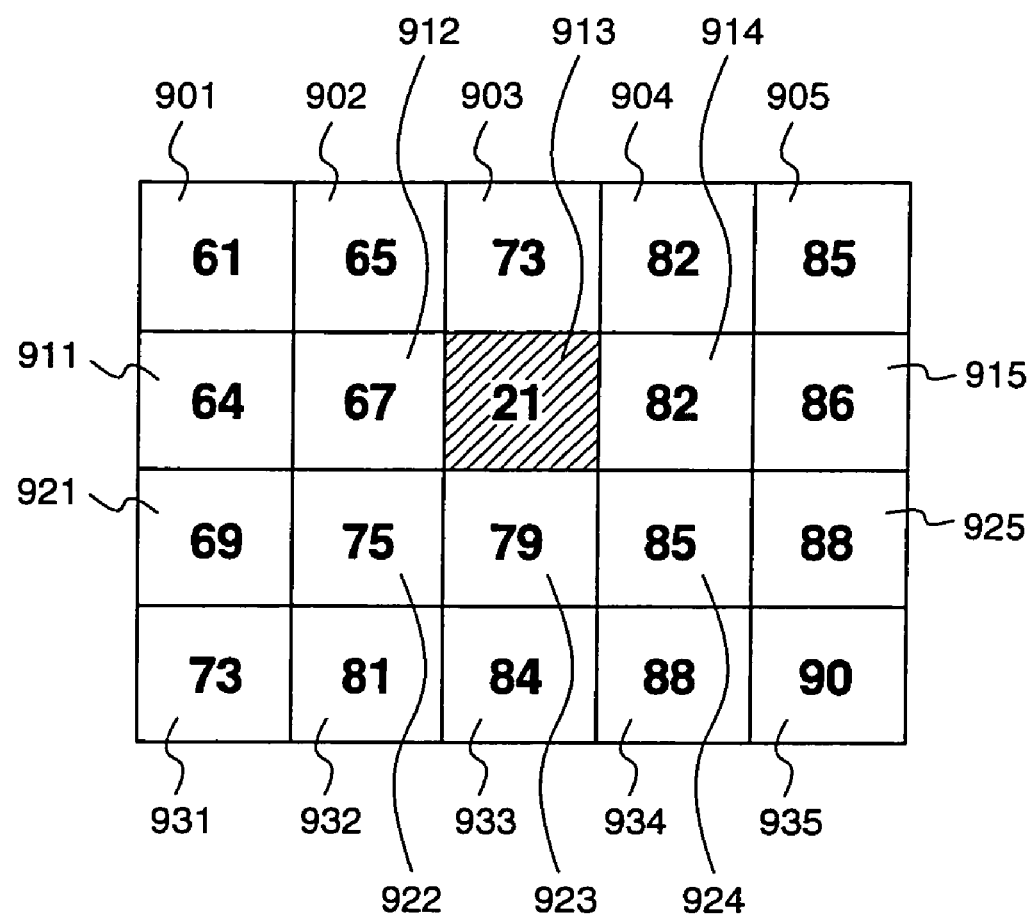
FIG. 9 is a diagram for explaining the operation of a threshold value determination change unit according to the second embodiment of the present invention.

Hereinafter, the above-mentioned threshold value judgement change unit will be described in detail using FIG. 9. FIG. 9 shows threshold values in different areas stored in the threshold memory. In FIG. 9, 901~935 denote the respective areas in the threshold memory, and boldface numbers shown in the respective areas indicate the threshold values thereof. It is assumed that the threshold value of the hatched area 913 is "21" which is different from the original value, because dust gets in the area. In the threshold value judgement change unit, comparison between the threshold value of a target area and the threshold values of the neighboring areas is carried out for all areas. When there is a considerable difference between them, for example, "20" or more, the threshold value of the target area is redefined by interpolation using the threshold values of the neighboring areas. For example, when the area 902 is the target area, the threshold value of this area is "65". The neighboring areas of the area 902 are 901, 911, 912, 913, and 903, and the threshold values of these areas are "61", "64", "67", "21", and "73", respectively. Accordingly, "65" is compared with "61", "64", "67", "21", "73". In this case, differences between "65" and these values are "4", "1", "2", "44", and "8", respectively, and there is only one difference exceeding "20". Since only one value exceeds "20" and "one" is less than half the five values compared, the threshold value "65" of the area 902 is used as it is.

On the other hand, when the area 913 is the target area, the threshold value of this area is "21". The neighboring areas of the area 913 are 902, 903, 904, 914, 924, 923, 922, and 912, and the threshold values of these areas are "65", "73", "82", "82", "85", "79", "75", and "67", respectively. Accordingly, "21" is compared with these values. In this cases, differences between "21" and these values are "44", "52", "61", "61", "64", "58", "54", and "46", respectively, and there are eight differences exceeding "20". In this case, since eight values exceed "20" and "eight" is larger than half the eight values compared, the threshold value of the area 913 is redefined by interpolation. The interpolation is carried out by calculating the average of the neighboring threshold values. In this case, (65+73+82+82+85+79+75+67)/8=76, and therefore, the threshold value of the area 913 is set at "76".

Since the threshold value judgement change unit is constructed as described above, even when a local area has an abnormal threshold value because of deformation of local histogram due to intrusion of dust or the like, an appropriate threshold value can be obtained.

Figure 8:
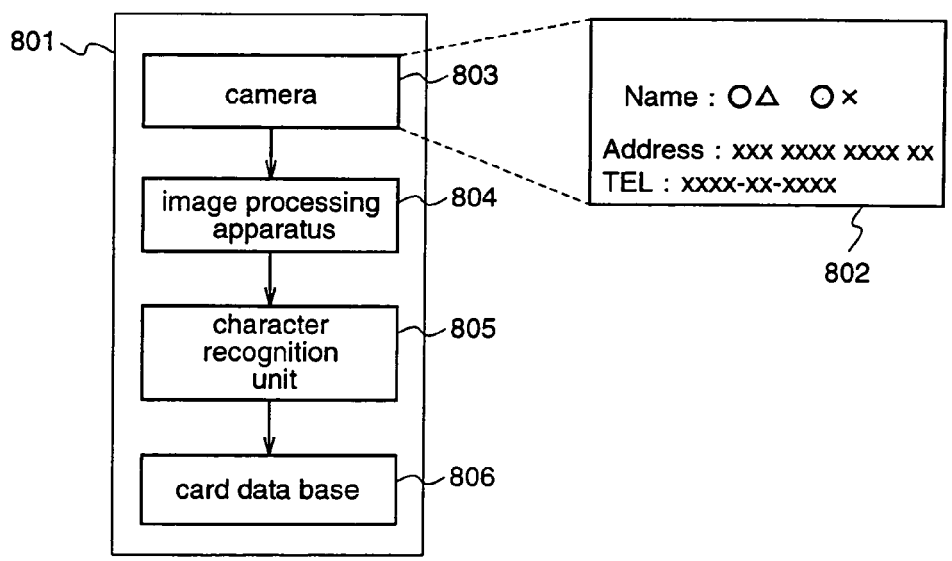
FIG. 8 is a block diagram for explaining a card reading function of a cellular phone with a built-in camera according to the second embodiment of the present invention.

Next, a description will be given of a card reading function of a cellular phone with a built-in camera, to which the image processing apparatus of the present invention is applied. FIG. 8 is a block diagram illustrating a cellular phone having a card reading function, in which the image processing apparatus according to the second embodiment of the invention is embedded. The cellular phone shoots a card with a built-in camera, reads characters on the card, and compiles the characters into a database.

With reference to FIG. 8, a cellular phone 801 shoots a card 802 to recognize characters, and then stores the characters in a database. More specifically, the card 802 is shot by a camera 803 embedded in the cellular phone 801 and stored as image data. This image is binarized in the image processing apparatus 804, and a background area is expressed by "1" while a character area is expressed by "0". The image binarized by the image processing apparatus 804 is subjected to character area pattern matching in a character recognition unit 805 to extract a character text. Then, the extracted character text is stored in a card data base 806.

There are cases where the image taken by the camera 803 has uneven brightness in the background area or the character area, for example, a portion of the background is dark, due to uneven lighting at shooting. Even in such cases, the image processing apparatus 804 of the present invention can accurately separate the character area from the background area, whereby the character recognition unit 805 can perform reliable character recognition.

While in this second embodiment a cellular phone with a built-in camera is taken as an example, any equipment capable of shooting a digital image, such as a scanner or a digital still camera, can achieve the same effects as mentioned above when it is provided with the image processing apparatus of the present invention.

As described above, according to the second embodiment of the invention, an image processing apparatus for executing the image processing method according to the first embodiment can be easily constructed.

The image processing method according to the present invention is useful as a binarization method for distinguishing a target image from a background image in an image having multiple levels of gray. Particularly, it is useful as a binarization method in a pretreatment for reading characters from a printed matter, or a binarization method in a pretreatment for performing automatic count of a target in a microscope image.

What is claimed is:

1. An image processing method for generating a binarized image from a gray-scale image as an original image, said method comprising the steps of:
   generating a histogram of the gray scale in the whole or a part of the original image;
   determining a first reference luminance value and a reference threshold value as a threshold value for binarization, on the basis of the histogram;
   storing a ratio between the first reference luminance value and the reference threshold value as a luminance ratio;
   generating a local histogram for a local area of the original image;
   determining a second reference luminance value on the basis of the local histogram, and determining a threshold value for binarization by performing an arithmetic operation on the second reference luminance value and the luminance ratio; and
   binarizing an image of an area in the vicinity of the local area of the original image by using the threshold value.

2. The image processing method of claim 1 wherein the second reference luminance value determined based on the local histogram is obtained by performing the same processing as that for the first reference luminance value.

3. The image processing method of claim 2 wherein the first reference luminance value and the second reference luminance value are luminance values at points in the histograms indicating the maximum values of the respective histograms.

4. The image processing method of claim 2 wherein the first reference luminance value and the second reference luminance value are luminance values at points in the histograms indicating the maximum values, which luminance values are determined after subjecting the respective histograms to low-pass filtering.

5. The image processing method of claim 1 wherein the reference threshold value is a luminance value in a concave portion adjacent to the maximum value of the histogram in the whole or a part of the original image.

6. The image processing method of claim 5 wherein when there is no concave portion adjacent to the maximum value of the histogram, a luminance value at an inflection point of the histogram is used as the reference threshold value.

7. The image processing method of claim 1 wherein a luminance value in a local convex portion adjacent to the maximum value of the histogram in the whole or a part of the original image and a luminance value at a point indicating the maximum value in the histogram are determined, to provide a value included between the both luminance values as the reference threshold value.

8. The image processing method of claim 1 wherein the reference threshold value is a luminance value in a position in the vicinity of the maximum value of the histogram in the whole or a part of the original image, wherein the ratio of the reference threshold value to the maximum value becomes a predetermined value.

9. The image processing method of claim 1 wherein a reference luminance value is determined as a luminance value in a position in the vicinity of the maximum value of the histogram in the whole or a part of the original image, wherein the ratio of the luminance value to the maximum value becomes a predetermined value, and the reference threshold value is determined as a luminance value in a position symmetrically opposed to the obtained reference luminance value with the luminance value at the maximum value in the center.

10. The image processing method of claim 1 wherein the whole original image is divided into plural local areas, and each local area is individually provided with a threshold value, and binarized using the threshold value.

11. The image processing method of claim 10 wherein
the whole original image is divided into plural local areas, and each local area is individually provided with a threshold value, and
when there is a local area having a threshold value significantly different from a predetermined value that is determined in comparison with a threshold value of an adjacent local area, the threshold value of this local area is reset by an arithmetic operation using the threshold value of the adjacent local area.

12. The image processing method of claim 1 wherein, when determining the luminance ratio, unnecessary values based on back ground characteristics are removed from the first reference luminance value and the reference voltage, respectively.

13. An image processing apparatus for generating a binarized image from a gray-scale image as an original image, said apparatus comprising:
a storage unit for storing multiple gray-level image data of the gray-scale image, and outputting, as a target image data, the whole or a specific area of the stored image data;
a histogram generation unit for generating a histogram of the gray scale in the target image data;
a reference luminance ratio generation unit for determining a first reference luminance value and a reference threshold value as a threshold value for binarization, on the basis of the histogram, and outputting a ratio between the first reference luminance value and the reference threshold value as a reference luminance ratio;
an image division unit for dividing the target image data into plural local areas and outputting the data, and outputting division information of the target image data;
a local histogram generation unit for generating a local histogram for each local area;
a local area reference luminous value generation unit for determining a second reference luminance value on the basis of the local histogram;
a threshold value generation unit for determining a threshold value for binarization by performing an arithmetic operation on the second reference luminance value and the reference luminance value; and
a binarization unit for binarizing the target image data for every local area on the basis of the division information, thereby generating a binarized image of the target image data.

14. The image processing apparatus of claim 13 wherein the histogram generation unit and the local histogram generation unit determine the first reference luminance value and the second reference luminance value by the same processing, respectively.

15. The image processing apparatus of claim 14 wherein the first reference luminance value and the second reference luminance value are luminance values at points in the histograms indicating the maximum values of the respective histograms.

16. The image processing apparatus of claim 14 wherein the first reference luminance value and the second reference luminance value are luminance values at points in the histograms indicating the maximum values, which luminance values are obtained after subjecting the respective histograms to low-pass filtering.

17. The image processing apparatus of claim 13 wherein the reference luminance ratio generation means employs, as the reference threshold value, a luminance value in a concave portion adjacent to the maximum value of the histogram in the target image data.

18. The image processing apparatus of claim 17 wherein when there is no concave portion adjacent to the maximum value of the histogram, a luminance value at an inflection point of the histogram is used as the reference threshold value.

19. The image processing apparatus of claim 13 wherein the reference luminance ratio generation unit obtains a luminance value in a local convex portion adjacent to the maximum value of the histogram in the target image data, and a luminance value at a point indicating the maximum value of the histogram, and employs a value included between the both luminance values as the reference threshold value.

20. The image processing apparatus of claim 13 wherein the reference luminance ratio generation unit determines, as the reference threshold value, a luminance value in a position in the vicinity of the maximum value of the histogram of the target image data, wherein the ratio of the luminance value to the maximum value becomes a predetermined value.

21. The image processing apparatus of claim 13 wherein the reference luminance ratio generation unit determines, as a reference luminance value, a luminance value in a position in the vicinity of the maximum value of the histogram in the whole or a part of the original image, wherein the ratio of the luminance value to the maximum value becomes a predetermined value, and the reference threshold value is determined as a luminance value in a position symmetrically opposed to the obtained reference luminance value with the luminance value at the maximum value in the center.

22. The image processing apparatus of claim 13 wherein the threshold value generation unit comprises:
a threshold value memory for holding the threshold values of the respective local areas;
a threshold value comparison unit for comparing the threshold value of a specific local area, which is stored in the threshold value memory, with the threshold values of neighboring local areas; and
a threshold value determination change unit for replacing the threshold value of the specific local area with an average of the threshold values of the neighboring local areas when the threshold value of the specific local area has a difference equal to or larger than a predetermined value as compared with the threshold values of the neighboring local areas.

23. The image processing apparatus of claim 13 being used as a card reading unit in a cellular phone having a built-in camera.

* * * * *